US009442787B2

(12) United States Patent
D'Abreu

(10) Patent No.: US 9,442,787 B2
(45) Date of Patent: Sep. 13, 2016

(54) THREE DIMENSIONAL (3D) MEMORY INCLUDING ERROR DETECTION CIRCUITRY

(71) Applicant: SANDISK TECHNOLOGIES INC., Plano, TX (US)

(72) Inventor: Manuel Antonio D'Abreu, El Dorado Hills, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/304,365

(22) Filed: Jun. 13, 2014

(65) Prior Publication Data

US 2015/0363248 A1     Dec. 17, 2015

(51) Int. Cl.
  G06F 11/00     (2006.01)
  G06F 11/07     (2006.01)
  G06F 11/10     (2006.01)

(52) U.S. Cl.
  CPC ......... *G06F 11/076* (2013.01); *G06F 11/1048* (2013.01); *G06F 11/1068* (2013.01)

(58) Field of Classification Search
  CPC ............... G06F 11/1072; G06F 11/10; G06F 11/1012; G06F 11/1068; G06F 11/1076; G06F 11/1016; G06F 11/1048; G06F 11/1044; G06F 11/0793; H03M 13/1525; H03M 13/151; H03M 13/1545; H03M 13/09; H03M 13/47
  See application file for complete search history.

(56) References Cited

U.S. PATENT DOCUMENTS

| | | | |
|---|---|---|---|
| 7,203,084 B2 | 4/2007 | Lee et al. | |
| 8,495,467 B1 | 7/2013 | Billing et al. | |
| 8,572,466 B2 * | 10/2013 | Bueb | G06F 11/1048 714/764 |
| 8,615,700 B2 * | 12/2013 | Dave et al. | 714/773 |
| 8,719,662 B2 * | 5/2014 | Eggleston et al. | 714/764 |
| 8,762,626 B2 * | 6/2014 | Bisen | G06F 11/1072 711/103 |
| 8,869,007 B2 * | 10/2014 | Cordero et al. | 714/773 |
| 8,892,980 B2 | 11/2014 | Fillingim | |
| 8,996,950 B2 * | 3/2015 | Desireddi | G06F 11/1012 714/758 |
| 9,021,338 B2 * | 4/2015 | Joo | H03M 13/05 714/773 |
| 9,047,210 B2 * | 6/2015 | D'Abreu | G06F 11/1048 |
| 9,092,350 B1 * | 7/2015 | Jeon | G06F 11/004 |
| 2007/0061672 A1 | 3/2007 | Eggleston et al. | |
| 2011/0040924 A1 * | 2/2011 | Selinger | 711/103 |
| 2011/0041005 A1 * | 2/2011 | Selinger | 714/6 |
| 2011/0041039 A1 * | 2/2011 | Harari et al. | 714/773 |
| 2013/0031443 A1 | 1/2013 | Oh et al. | |

(Continued)

OTHER PUBLICATIONS

Shah, Agam "Samsung's New 1TB SSD is Based on Latest 3D Technology," IT World, http://www.itworld.com/print/420770, May 28, 2014, 1 page.

(Continued)

*Primary Examiner* — Nadeem Iqbal
(74) *Attorney, Agent, or Firm* — Toler Law Group, PC

(57) ABSTRACT

A method performed at a non-volatile memory of a data storage device includes determining, at error detection circuitry included in the non-volatile memory, an indication of a number of errors associated with a portion of the non-volatile memory. The method also includes providing the indication to a controller of the data storage device, where the controller includes error correction circuitry. The non-volatile memory has a 3D configuration that is monolithically formed in one or more physical levels of arrays of memory cells having an active area disposed above a silicon substrate. The non-volatile memory includes circuitry associated with operation of the memory cells.

20 Claims, 6 Drawing Sheets

(56) References Cited

U.S. PATENT DOCUMENTS

| | | | |
|---|---|---|---|
| 2013/0117620 A1* | 5/2013 | Joo | G11C 16/10 |
| | | | 714/746 |
| 2013/0117634 A1* | 5/2013 | Joo | H03M 13/05 |
| | | | 714/770 |
| 2013/0339820 A1* | 12/2013 | Cordero et al. | 714/773 |
| 2013/0339821 A1* | 12/2013 | Cordero | G06F 11/1666 |
| | | | 714/773 |
| 2014/0036590 A1 | 2/2014 | Feeley et al. | |
| 2014/0047298 A1* | 2/2014 | Radke | G06F 11/1068 |
| | | | 714/763 |
| 2015/0012794 A1 | 1/2015 | Losh et al. | |

OTHER PUBLICATIONS

Msystems, Inc. "mDOC H1 4Gb (512MByte) and 8Gb (1GByte) High Capacity Flash Disk with NAND and x2 Technology," Data Sheet, Rev. 1.1, 95-DT-1104-01, 2006, 64 pages.

International Search Report and Written Opinion of the International Searching Authority (EPO) for International 4pplication No. PCT/US2015/031340, mailed Nov. 2, 2015, 20 pages.

PCT Application No. PCT/US2015/031340, Invitation to Pay Additional Fees And, Where Applicable, Protest Fee, mailed Sep. 8, 2015, 7 pages.

* cited by examiner

THREE DIMENSIONAL (3D) MEMORY INCLUDING ERROR DETECTION CIRCUITRY

FIELD OF THE DISCLOSURE

The present disclosure is generally related to a three dimensional (3D) memory that includes error detection circuitry.

BACKGROUND

Non-volatile data storage devices, such as embedded memory devices (e.g., embedded MultiMedia Card (eMMC) devices) and removable memory devices (e.g., removable universal serial bus (USB) flash memory devices and other removable storage cards), have allowed for increased portability of data and software applications. Users of non-volatile data storage devices increasingly rely on the non-volatile storage devices to store and provide rapid access to a large amount of data.

Due to manufacturing defects and/or wear and tear, a data storage device may exhibit errors. The data storage device may be capable of performing error correction to correct certain types of errors. To perform error correction and other memory management operations, data may be read from a memory on a first chip/die and provided to a controller on a second chip/die via a bus. The controller may detect and correct errors after receiving the data via the bus. Transmission of data from the memory to the controller for error detection and other memory management operations may increase traffic on the bus, which may reduce read/write throughput of the data storage device.

SUMMARY

A data storage device including a controller and a non-volatile memory is disclosed, where the non-volatile memory includes (e.g., is on the same chip/die as) error detection circuitry. A bus between the non-volatile memory and the controller may experience high data traffic due to read and write operations, such as in situations where the non-volatile memory is a three-dimensional (3D) memory that is capable of storing a large amount of data in a small space. In accordance with the described techniques, the non-volatile memory may read data from a storage area and perform error detection without sending the data from the non-volatile memory to the controller via the bus. To illustrate, instead of sending read data (e.g., an error correction code (ECC) codeword) to the controller, the error detection circuitry (e.g., an ECC decoder or portion thereof) may send the controller an indication of how many errors were detected when reading a particular portion (e.g., word line) of non-volatile memory. The indication of the number of detected errors may occupy fewer bits than the ECC codeword, thereby reducing bus traffic associated with error detection.

The error detection circuitry in the non-volatile memory may determine the indication of the number of errors during a read operation initiated by the controller or during a background/memory management operation, such as during garbage collection or wear leveling. Based on the indication of the number of detected errors, error correction circuitry within the controller may request data from the non-volatile memory and perform error correction on the data. The controller may also track errors detected in different portions of the memory, and use such tracking data to initiate memory management operations. For example, when the controller determines that a particular word line consistently or repeatedly exhibits a large number of errors, the controller may check neighboring word lines to identify word line to word line shorts.

DETAILED DESCRIPTION

Particular embodiments of the present disclosure are described with reference to the drawings. In the description, common features are designated by common reference numbers throughout the drawings.

Figure 1:
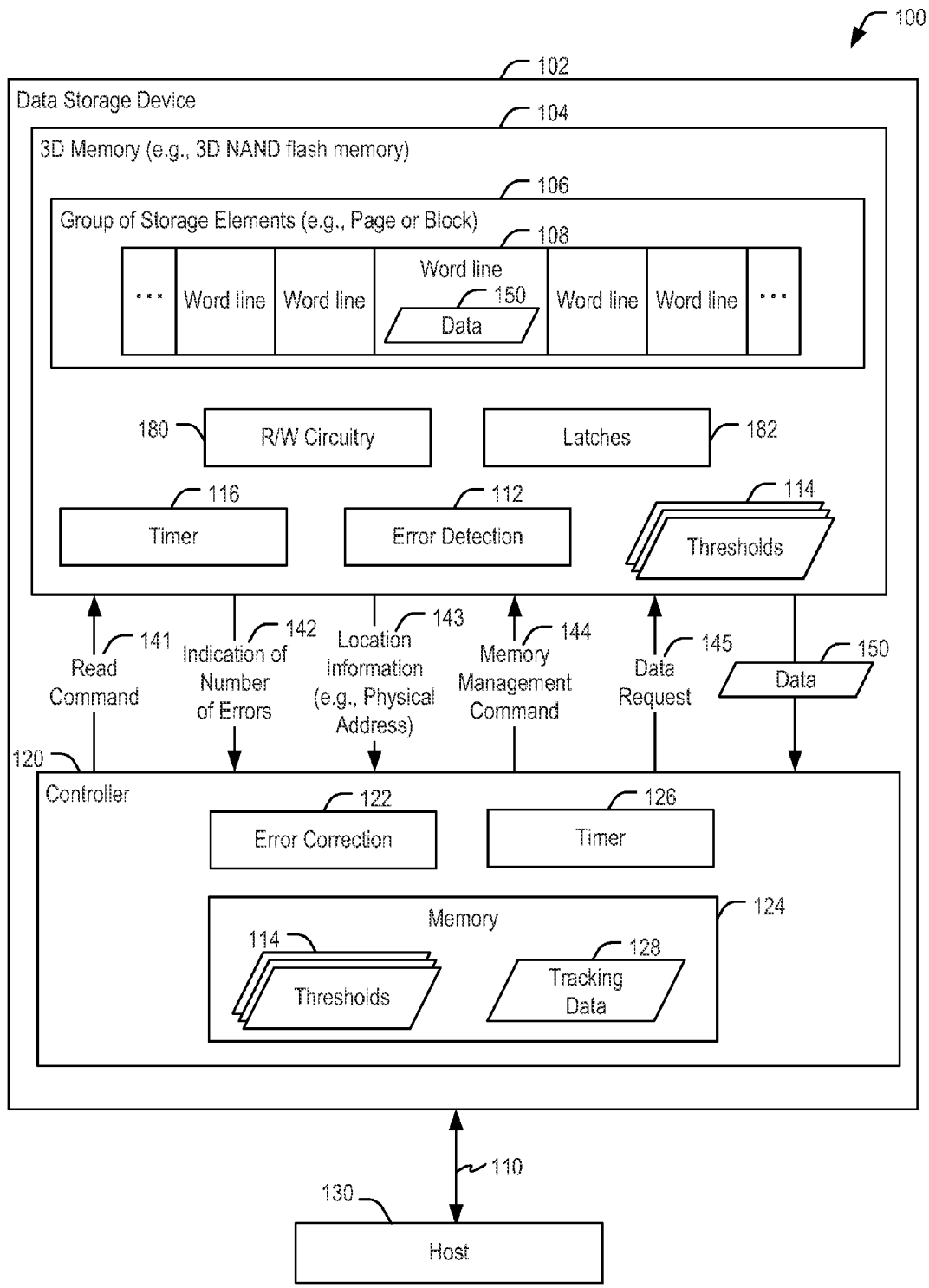
FIG. 1 is a block diagram of a particular illustrative embodiment of a system including a three-dimensional (3D) memory with error detection circuitry.

Referring to FIG. 1, a particular embodiment of a system 100 includes a data storage device 102 coupled to a host device 130 via a host interface 110. The data storage device 102 includes a three-dimensional (3D) memory 104, where the 3D memory 104 includes error detection circuitry 112.

The host device 130 may be configured to provide data (e.g., user data) to be stored at the 3D memory 104 or to request data to be read from the 3D memory 104. For example, the host device 130 may include a mobile telephone, a music player, a video player, a gaming console, an electronic book reader, a personal digital assistant (PDA), a computer, such as a laptop computer or notebook computer, any other electronic device, or any combination thereof. The host device 130 communicates via a memory interface that enables reading from the 3D memory 104 and writing to the 3D memory 104. For example, the host device 130 may operate in compliance with a Joint Electron Devices Engineering Council (JEDEC) industry specification, such as a Universal Flash Storage (UFS) Host Controller Interface specification. As other examples, the host device 130 may operate in compliance with one or more other specifications, such as a Secure Digital (SD) Host Controller specification as an illustrative example. The host device 130 may communicate with the 3D memory 104 in accordance with any other suitable communication protocol.

The data storage device 102 includes the 3D memory 104 coupled to a controller 120. The 3D memory 104 may be a non-volatile memory, such as a NAND flash memory or a resistive random access memory (ReRAM). Examples of 3D NAND and ReRAM architectures are described with reference to FIGS. 5 and 6, respectively. The 3D memory 104 includes a group of storage elements 106. The group of storage elements 106 may be arranged in one or more pages, one or more wordlines, and/or one or more blocks. For purposes of illustration, the group of storage elements 106 are illustrated as being divided into multiple word lines. Each of the multiple word lines may include one or more pages (e.g., physical pages). Additionally, each of the multiple word lines may be in a block of the memory 104. The multiple word lines may include a representative word line 108 that stores data 150. The word line 108 may include one or more storage elements, such as one or more multi-level cell (MLC) flash cells. The data 150 may include one or more error correction code (ECC) codewords. As an illustrative non-limiting example, the data 150 may include one or more data bits and one or more parity bits that are appended to the one or more data bits. The data 150 may differ from an ECC codeword due to one or more bit errors occurring in the data 150.

The data storage device 102 may be configured to be coupled to the host device 130 as embedded memory, such as eMMC® (trademark of JEDEC Solid State Technology Association, Arlington, Va.) and eSD, as illustrative examples. To illustrate, the data storage device 102 may correspond to an eMMC (embedded MultiMedia Card) device. As another example, the data storage device 102 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The 3D memory 104 also includes circuitry associated with operation of the storage elements, such as read/write circuitry 180 and/or one or more data latches 182. The data latches 182 are configured to store data read from storage elements of the 3D memory 104 or to be written to storage elements. The read/write circuitry 180 is configured to control reading of data from storage elements of the 3D memory 104 to the data latches 182 or writing of data from the data latches 182 into storage elements of the 3D memory 104.

The 3D memory 104 further includes error detection circuitry 112. The error detection circuitry 112 may be coupled to the data latches 182. The read/write circuitry 180 may provide data read from the group of storage elements 106, such as the data 150, to the error detection circuitry 112 via the data latches 182. The error detection circuitry 112 may be configured to determine an indication 142 of a number of errors associated with a portion of the 3D memory 104, such as the word line 108. For example, the error detection circuitry 112 may determine the indication 142 associated with the word line 108 based on performing particular ECC decoding operations on the data 150. The error detection circuitry 112 may provide (e.g., send) the indication 142 to the controller 120, such as via a bus that connects the 3D memory 104 and the controller 120. It should be noted that although one or more embodiments are described herein with reference to determining the indication 142 for a word line, this is not limiting. In alternate embodiments, the indication 142 may be determined based on a different size portion of the 3D memory, such as a particular number of codewords, rows, blocks, pages, etc.

The error detection circuitry 112 may be implemented using hardware (e.g., complementary metal oxide semiconductor (CMOS) logic, such as AND gates, OR gates, XOR gates, shifters, etc.), software (e.g., a programmable microcontroller), or a combination thereof. In a particular embodiment, the error detection circuitry 112 may include an ECC decoder, or at least a portion thereof. For example, the error detection circuitry 112 may include one or more components configured to decode data that is encoded in accordance with a Bose-Chaudhuri-Hocquenghem (BCH) code, a Reed Solomon code, a low density parity check (LDPC) code, a turbo code, one or more other ECC schemes, or any combination thereof.

In a particular embodiment, the error detection circuitry 112 includes a syndrome generator. The syndrome generator may perform parity checks by performing XOR operations based on an input codeword (e.g., all or a portion of the data 150). The syndrome generator may generate a syndrome vector as output, where the syndrome vector includes a sequence of bits corresponding to results of the parity checks. A syndrome weight of the syndrome vector corresponds to the number of bits having a "1" value, where each "1" value represents a failed parity check. In a particular embodiment, the indication 142 is the syndrome. In another particular embodiment, the indication 142 of the number of errors is equal to, or based on, the number of failed parity checks (e.g., the syndrome weight). Thus, in particular embodiments, the error detection circuitry 112 may determine the indication 142 without performing an error correction operation and without identifying an error location, such as the location of a particular erroneous bit in the codeword.

In a particular embodiment, the error detection circuitry 112 includes a syndrome generator and a polynomial generator. For example, the polynomial generator may implement a Berlekamp method of error location polynomial generation. A polynomial generated by the polynomial generator may be used to determine location(s) of errors) in an input codeword, and the indication 142 may represent the polynomial or may correspond to an order of the polynomial.

Conventional ECC decoders may include additional components besides a syndrome generator and a polynomial generator. For example, an error locations module that performs Chien searches to identify error locations based on the output polynomial may be included in a conventional ECC decoder. As another example, an error magnitudes module that calculates error values at the identified error locations based on a Forney algorithm may be included in a conventional ECC decoder. As yet another example, an error corrections module that corrects errors (e.g., by flipping erroneous bits) may be included in a conventional ECC decoder. In contrast to conventional ECC decoders, the error detection circuitry 112 may not include an error locations module, an error magnitudes module, or an error correction module.

The controller 120 is configured to receive data and instructions from and to send data to the host device 130 while the data storage device 102 is operatively coupled to the host device 130. The controller 120 is further configured to send data and commands to the 3D memory 104 and to receive data from the 3D memory 104. For example, the controller 120 is configured to send data and a write command to instruct the 3D memory 104 to store the data to a specified address. As another example, the controller 120 is configured to send a read command to read data from a specified address of the 3D memory 104.

The controller 120 includes error correction circuitry 122. The error correction circuitry 122 may be configured to correct, up to an error correction capability of an ECC scheme in use, any bit errors that may be present in data received from the 3D memory. In a particular embodiment, the error correction circuitry 122 and the error detection circuitry 112 form part of a distributed ECC engine. Alternatively, or in addition, the error correction circuitry 122 may include detection circuitry that may be used during error correction operations performed at the controller 120. The error detection circuitry at that controller 120 may be the same as, or may differ from, the error detection circuitry 112. In addition to various operations described herein with reference to the error detection circuitry 112 and the error correction circuitry 122, the ECC engine may receive data from the host device 130 to be stored to the 3D memory 104. The ECC engine may generate, based on the received data, a codeword for storage in the 3D memory 104. The ECC engine may also correct errors in data read from the 3D memory 104 and provide the corrected data to the host device 130.

In a particular embodiment, the 3D memory 104 and the error detection circuitry 112 are located on a first chip or die of the data storage device 102. The controller 120 may be located on a second chip or die of the data storage device 102 that is distinct from the first chip or die. Communication between the chips/dies may occur via a bus. For example, during read and write operations, addresses and data (e.g., codewords) may be communicated via the bus.

During operation, the error detection circuitry 112 may determine the indication 142 of the number of errors associated with a particular portion of the 3D memory 104, such as the word line 108. In a particular embodiment, the error detection circuitry 112 determines the indication 142 in response to a read command 141 from the controller 120. For example, the controller 120 may send the read command 141 to the 3D memory 104 as part of a read operation initiated by the host device 130.

Alternatively, or in addition, the indication 142 may be determined during a background and/or memory management operation. For example, the indication 142 may be determined when a data read occurs at the 3D memory 104 during a garbage collection operation or a wear leveling operation. Thus, the indication 142 may be determined independent of operations triggered by the host device 130. As another example, the indication 142 may automatically be determined, such as periodically in response to expiration of a timer 116 in the 3D memory 104 or expiration of a timer 126 in the controller 120. The indication 142 may serve as a health indicator for the corresponding portion of the 3D memory 104.

In a particular embodiment, the error detection circuitry 112 may provide location information 143 to the controller 120. For example, when the indication 142 is associated a particular portion of the 3D memory 104, the location information 143 may correspond to a physical address of the particular portion.

In a particular embodiment, the 3D memory 104 may selectively provide the data 150 to the controller 120. For example, the 3D memory 104 may store one or more thresholds 114. In some implementations, the error detection circuitry 112 may compare an estimated or actual number of errors to one or more of the thresholds 114 and may generate the indication 142 to be sent to the controller 120 in response to the number of errors equaling or exceeding the threshold. For example, the indication 142 may be a flag bit indicating that a threshold number of errors has been detected. In other implementations, when a value of the indication 142 satisfies (e.g., exceeds) a particular threshold, such as a number of errors or a syndrome weight, the 3D memory 104 may send the indication 142 to the controller. Alternatively, when the indication 142 satisfies (e.g., exceeds) a particular threshold, the 3D memory 104 may send the data 150 to the controller 120 (e.g., for error correction or other memory management operations). Alternatively, or in addition, the thresholds 114 may be stored in a memory 124 of the controller 120, and the controller 120 may send a data request 145 to the 3D memory 104 in response to determining that the indication 142 satisfies a particular threshold. Different thresholds may be used for different portions of the 3D memory 104, for different memory management operations, etc. One or more of the thresholds 114 may be independent of (e.g., less than or greater than) an error correction capability of the error correction circuitry 122. Alternatively, or in addition, one of the thresholds 114 may be equal to the error correction capability.

In a particular embodiment, the controller 120 stores tracking data 128 associated with error detection operations performed by the error detection circuitry 112. For example, the tracking data 128 may include values of the indication 142 for different portions of the 3D memory 104 determined at different times. The controller 120 may analyze the tracking data 128 based on one or more heuristics to determine whether to initiate memory management operations. As an illustrative non-limiting example, the tracking data 128 may indicate that a first word line of the 3D memory 104 consistently or repeatedly exhibits a large number of errors. In response, the controller 120 may cause the error detection circuitry 112 to determine a second indication of a second number of errors associated with a second word line that is adjacent to the first word line. If the second word line also exhibits a large number of errors, the controller 120 may determine that a word line to word line short exists between the first word line and the second word line. Thus, based at least in part on the indication 142, the controller 120 may determine to mark a particular portion of the 3D memory 104 as erroneous, decommission a portion of the 3D memory 104, etc. The controller 120 may trigger one or more memory management operations by sending the 3D memory 104 a memory management command 144, as shown.

In a particular embodiment, different portions of the 3D memory 104 may be scanned for errors at different frequencies. For example, potential "bad" blocks of the 3D memory 104 that have exhibited a large (e.g., satisfying one of the thresholds 114) number of errors in the past may be scanned by the error detection circuitry 112 more often. Alternatively, or in addition, when the indication 142 corresponds to a large number of errors, the controller 120 may perform wear leveling prior to attempting error correction.

The indication 142 may occupy fewer bits than the data 150 (e.g., one or more entire ECC codewords). Thus, the system 100 of FIG. 1 may provide an ability to perform error detection with reduced traffic between the 3D memory 104 and the controller 120. The reduction in traffic may result in increased read/write throughput in the data storage device 102. Further, the 3D memory 104 may automatically perform error detection and provide the indication 142 to the controller 120 in a proactive fashion without being instructed to do so by the host device 130 or the controller 120, which may improve a reliability of the 3D memory 104. Improved reliability may enable operation using a less powerful ECC engine, may result in reduced power consumption, may result in reduced device size, may result in reduced manufacturing cost, or any combination thereof. Alternatively, or in addition, improved reliability may enable longer operational life of the 3D memory 104.

Figure 2:
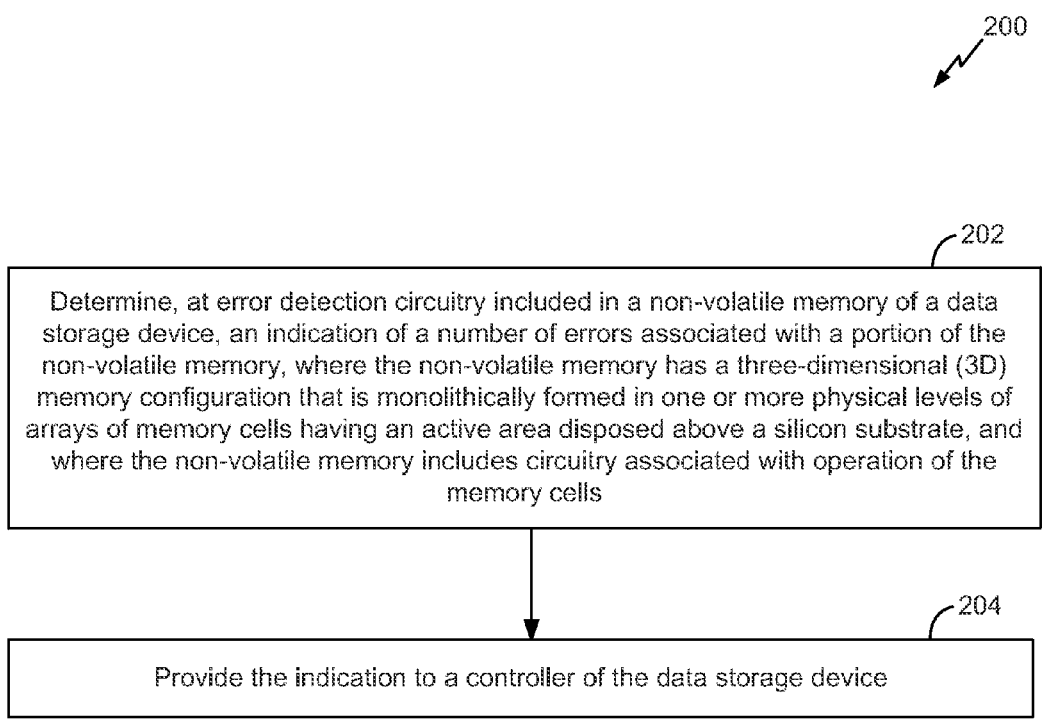
FIG. 2 is a flow diagram of an illustrative embodiment of a method of performing error detection at a 3D memory.

Referring to FIG. 2, a flow diagram of a particular embodiment of a method 200 of performing error detection at a non-volatile memory is shown. In an illustrative embodiment, the method 200 may be performed by the 3D memory 104 of FIG. 1.

The method 200 includes determining, at error detection circuitry included in a non-volatile memory of a data storage device, an indication of a number of errors associated with a portion of the non-volatile memory, at 202. For example, in FIG. 1, the error detection circuitry 112 may determine the indication 142. In a particular embodiment, the non-volatile memory has a 3D memory configuration that is monolithically formed in one or more physical levels of arrays of memory cells having an active area disposed above a silicon substrate, where the non-volatile memory includes circuitry associated with operation of the memory cells.

The method 200 also includes providing the indication to a controller of the data storage device, at 204. For example, in FIG. 1, the error detection circuitry may provide the indication 142 to the controller 120.

Figure 3:
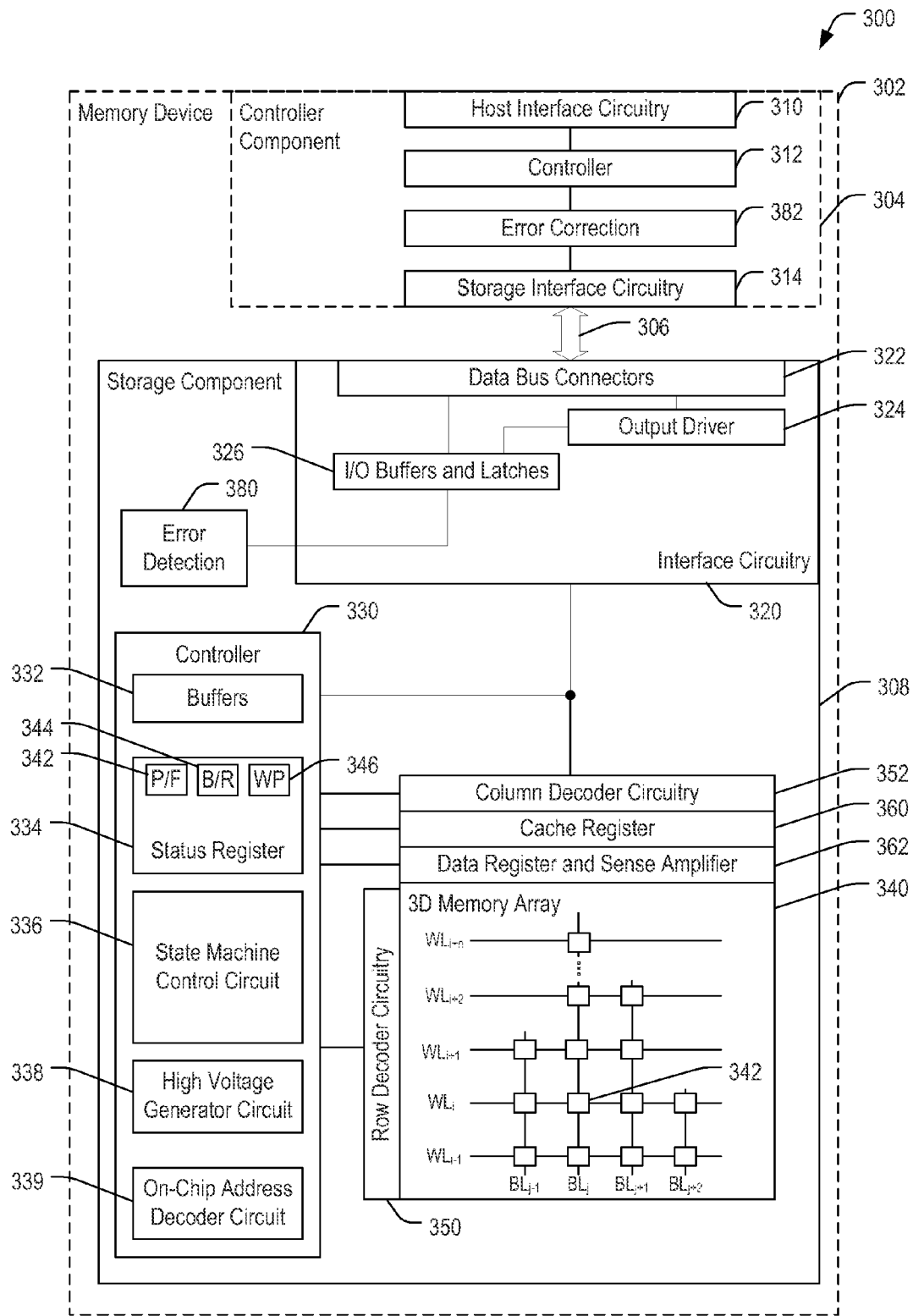
FIG. 3 is a block diagram of another illustrative embodiment of a system including a 3D memory with error detection circuitry.

Referring to FIG. 3, an illustrative embodiment of a system 300 is depicted and generally designated 300. The system 300 includes a memory device 302 that includes a controller component 304 coupled to a storage component 308.

In a particular embodiment, the memory device 302 may be the data storage device 102 of FIG. 1. The controller component 304 may include host interface circuitry 310, a controller 312, and storage interface circuitry 314. The controller component 304 may also include error correction circuitry 382, which may operate as described with reference to the error correction circuitry 122 of FIG. 1. The controller component 304 may be coupled to the storage component 308 via a bus 306, such as an 8-bit or 16-bit parallel data bus, as an illustrative, non-limiting example. The controller component 304 may communicate instructions and data with an external host (not shown) via the host interface circuitry 310. The controller 312 may be configured to respond to instructions received by the host interface circuitry 310 and may also be configured to send and receive data and instructions to the storage component 308 via the storage interface circuitry 314.

In a particular embodiment, the storage component 308 includes interface circuitry 320, a controller 330 coupled to the interface circuitry 320, and a 3D memory array 340 accessible to the controller 330. The storage component 308 may include row decoder circuitry 350 and column decoder circuitry 352 that enable access to data stored at one or more particular rows and particular columns of the memory array 340, such as to read a value from or to write a value to a particular memory cell 342 at a bit line $BL_j$ and at word line $WL_i$. A cache register 360 and a data register and sense amplifier 362 may further be coupled to the memory array 340 and may be used to cache or to temporarily store data that is to be written to the memory array 340 or data that has been read out of the memory array 340. In a particular embodiment, the memory array 340 may include a flash memory.

In a particular embodiment, the controller 330 includes one or more buffers 332 to store instructions, data, or any combination thereof. The controller 330 may also include one or more status registers 334, a state machine control circuit 336, a high voltage generator circuit 338, and an on-chip address decoder circuit 339. The controller 330 may be coupled to provide electrical signals to the row decoder circuitry 350, to the column decoder circuitry 352, to the cache register 360, and to the data register and sense amplifier 362.

In a particular embodiment, the status register 334 of the controller 330 may include one or more indicators storing values, such as a Pass/Fail (P/F) value 342, a Busy/Ready (B/R) value 344, a write protect (WP) value 346, one or more other indicators, or a combination thereof. The status register 334 may be accessible to the state machine control circuit 336.

The state machine control circuit 336 may include dedicated hardware and circuitry to control an operation of the controller 330 in response to one or more received instructions and internal states, such as may be represented at the status register 334. The state machine control circuit 336 may include states such as a read status state, a data write state, a data read state, as illustrative, non-limiting examples.

In a particular embodiment, the high voltage generator circuit 338 may be responsive to the state machine control circuit 336 and may be configured to generate a high voltage to program values to, or erase values from, the 3D memory array 340. For example, the 3D memory array 340 may be a flash memory or other memory that may be programmable or erasable via a "high" voltage, such as, for example, five volts (V). The controller 330 may also include the on-chip address decoder circuit 339 that may include hardware and logic circuitry to receive memory address information from the controller component 304 and to decode the memory address information to specific rows and columns to be provided to the row decoder circuitry 350 and the column decoder circuitry 352.

The interface circuitry 320 may include data bus connectors 322, an output driver 324 coupled to the data bus connectors 322, and input/output (I/O) buffers and latches 326. The I/O buffers and latches 326 may be configured to store or to latch data that is received via the data bus connectors 322 or data that is to be written to the data bus 306 via the data bus connectors 322. The I/O buffers and latches 326 may be coupled to error detection circuitry 380, which may function as described with reference to the error detection circuitry 112 of FIG. 1. Although the error detection circuitry 380 is illustrated in FIG. 3 as being external to the interface circuitry 320 and the on-board controller 330 of the storage component 308, in alternate embodiments the error detection circuitry 380 may be part of the interface circuitry 320 or the controller 330. The data bus connector 322 may include physical electrical connectors that couple the interface circuitry 320 to the data bus 306. The output driver 324 may include dedicated circuitry and electrical connections to enable the interface circuitry 320 to drive electrical signals over the bus 306. In a particular embodiment, the interface circuitry 320 is configured to comply with one or more bus communications protocols or standards.

Figure 4:
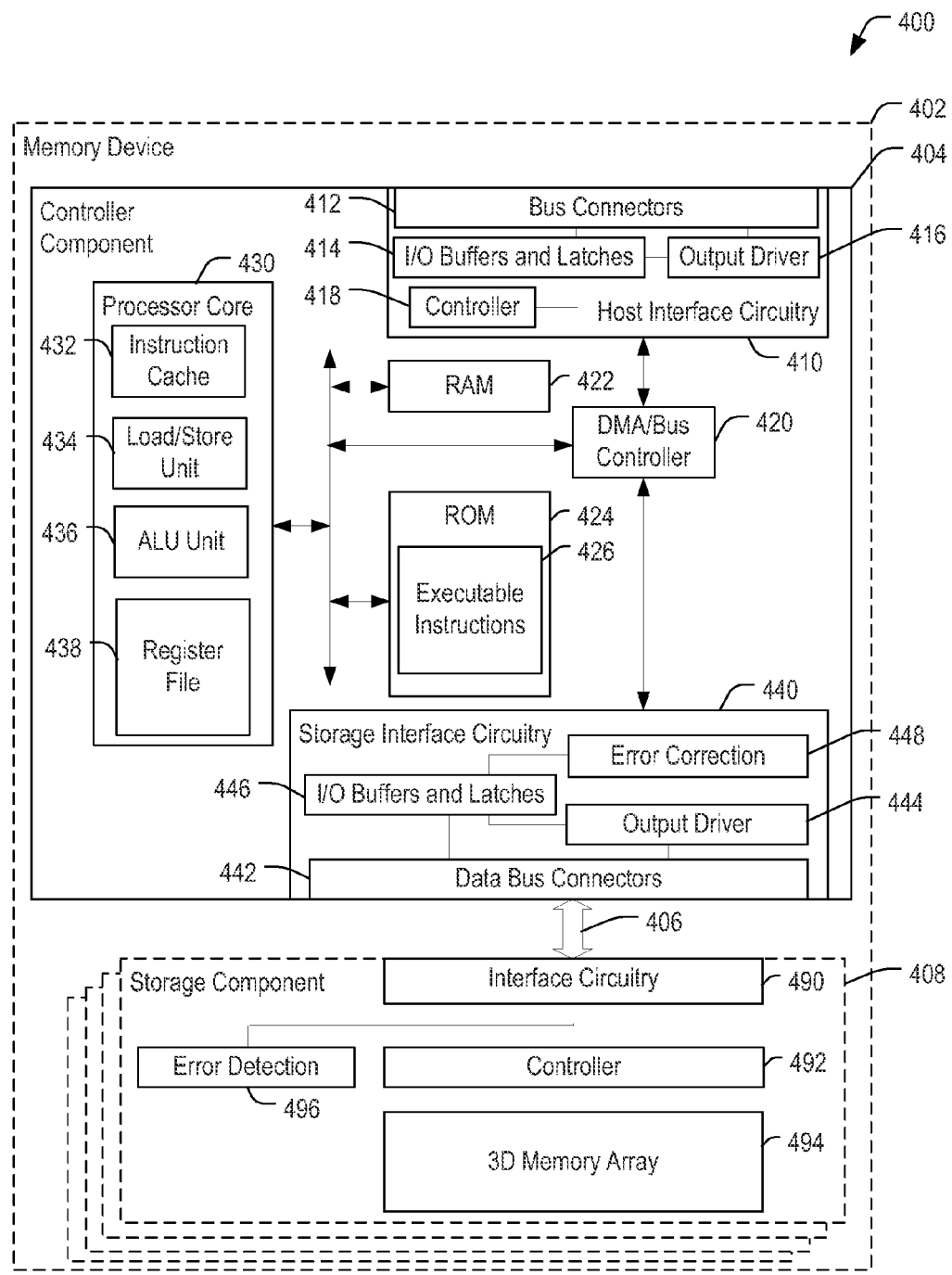
FIG. 4 is a block diagram of another illustrative embodiment of a system including a 3D memory with error detection circuitry.

Referring to FIG. 4, an illustrative embodiment of a system is depicted and generally designated 400. The system 400 includes a memory device 402 that includes a controller component 404 coupled to one or more storage components, such as a representative storage component 408, via a bus 406. The representative storage component 408 includes interface circuitry 490 to communicate via the bus 406. The storage component 408 also includes a controller 492 that is coupled to the interface circuitry 490 and that is also coupled to a memory, such as a memory array 494. The memory array 494 may include one or more types of storage media such as a 3D NAND array or a ReRAM array. In a particular embodiment, the memory device 402 may be the data storage device 102 of FIG. 1. The storage component 408 may also include error detection circuitry 496, which may operate as described with reference to the error detection circuitry 112 of FIG. 1.

In a particular embodiment, the controller component 404 includes host interface circuitry 410 coupled to a direct memory access (DMA)/bus controller 420. The controller component 404 also includes storage interface circuitry 440 that is coupled to the DMA/bus controller 420. A processor core 430, a random access memory (RAM) 422 and a read-only memory (ROM) 424 are coupled to the DMA/bus controller 420 via an internal bus.

In a particular embodiment, the host interface circuitry 410 includes bus connectors 412 coupled to input/output (I/O) buffers and latches 414. The bus connectors 412 are further coupled to output driver circuitry 416. The host interface circuitry 410 also includes a controller 418. In a particular embodiment, the host interface circuitry 410 operates in accordance with a universal serial bus (USB) protocol. For example, the controller 418 may be programmed to receive USB protocol instructions and data from a host device (not shown) via the bus connectors 412 that are coupled to a universal serial bus. The controller 418 may include a hardware processor that executes instructions stored at an internal memory, such as a read-only memory (not shown) to enable receipt and acknowledgment of USB instructions and data. Alternatively, or in addition, the host interface circuitry 410 may be configured to support other communication protocols, such as a Secure Digital (SD) protocol, a small computer system interface (SCSI), parallel interface (SPI), a Compact Flash (CF) protocol, one or more other protocols, or any combination thereof.

In a particular embodiment, the processor core 430 includes an instruction cache 432, a load/store unit 434, an arithmetic logic unit (ALU) unit 436, and a register file 438. The processor core 430 may include, or may function substantially similarly to, an ARM core, as an illustrative, non-limiting example. For example, the processor core 430 may support a reduced instruction set computer (RISC) micro-architecture. The processor core 430 may be configured to retrieve data and executable instructions 426 via the load/store unit 434 from the read only memory 424.

Alternatively, or in addition, at least some of the executable instructions 426 may not be stored at the ROM 424 and may instead be stored at the memory array 494. The executable instructions 426 may be retrieved from the memory array 494 and stored at the RAM 422. The processor core 430 may be configured to retrieve the executable instructions 426 from the RAM 422 for execution.

The executable instructions 426 may be retrieved by the load/store unit 434 and stored to the instruction cache 432. The executable instructions 426 at the instruction cache 432 may be scheduled and provided to one or more execution pipelines, such as an execution pipeline including the ALU unit 436. The ALU unit 436 may include dedicated circuitry to perform arithmetic and logic operations, such as addition and subtraction, AND, NOT, OR, exclusive-OR (XOR), other arithmetic or logic operations, or any combination thereof.

The register file 438 may include multiple memory cells that may provide high speed access to the processor core 430 of data to be used for execution of instructions. One or more memory cells at the register file 438 may be dedicated to store a status indicator. Additional data values, such as values to indicate memory type, memory write status, and write protect status, may also be set during execution of the executable instructions 426 at the processor core 430.

The storage interface circuitry 440 may include data bus connectors 442, an output driver 444, input/output buffers and latches 446, and error correction circuitry 448. The error correction circuitry 448 may operate as described with reference to the error correction circuitry 122 of FIG. 1. In a particular embodiment, the error correction circuitry 448 is part of an ECC engine. The data bus connectors 442 may include electrical connectors to enable electrical signal propagation via the bus 406. The I/O buffers and latches 446 may be configured to store data that is received via the DMA/bus controller 420 to be transmitted via the bus 406 using electrical signals at the data bus connectors 442 that are generated by the output driver 444. In addition, or alternatively, the I/O buffers and latches 446 may store data values represented by electrical signals received at the data bus connectors 442 via the data bus 406, such as signals generated by the interface circuitry 490 of the storage component 408.

The error correction circuitry 448 may include dedicated hardware and circuitry configured to perform operations using data and error correcting code information corresponding to the data that are received as a result of a memory read from the storage component 408. The error correction circuitry 448 may also perform operations based on receiving an indication of a number of errors associated with a portion of the memory array 494 of the storage component 408. The storage interface circuitry 440 may include a flash memory interface, and the error correction circuitry 448 may be compliant with one or more flash error correcting code protocols.

The executable instructions 426 may include instructions that are executable by the processor core 430 to perform memory management responsive to receiving an error indication from the error detection circuitry 496, such as the indication 142 of FIG. 1. For example, the executable instructions 426 may include instructions to request a read of data from the storage component 408 to perform error correction and/or as part of a garbage collection or wear leveling process initiated in response to the error indication.

Figure 5:
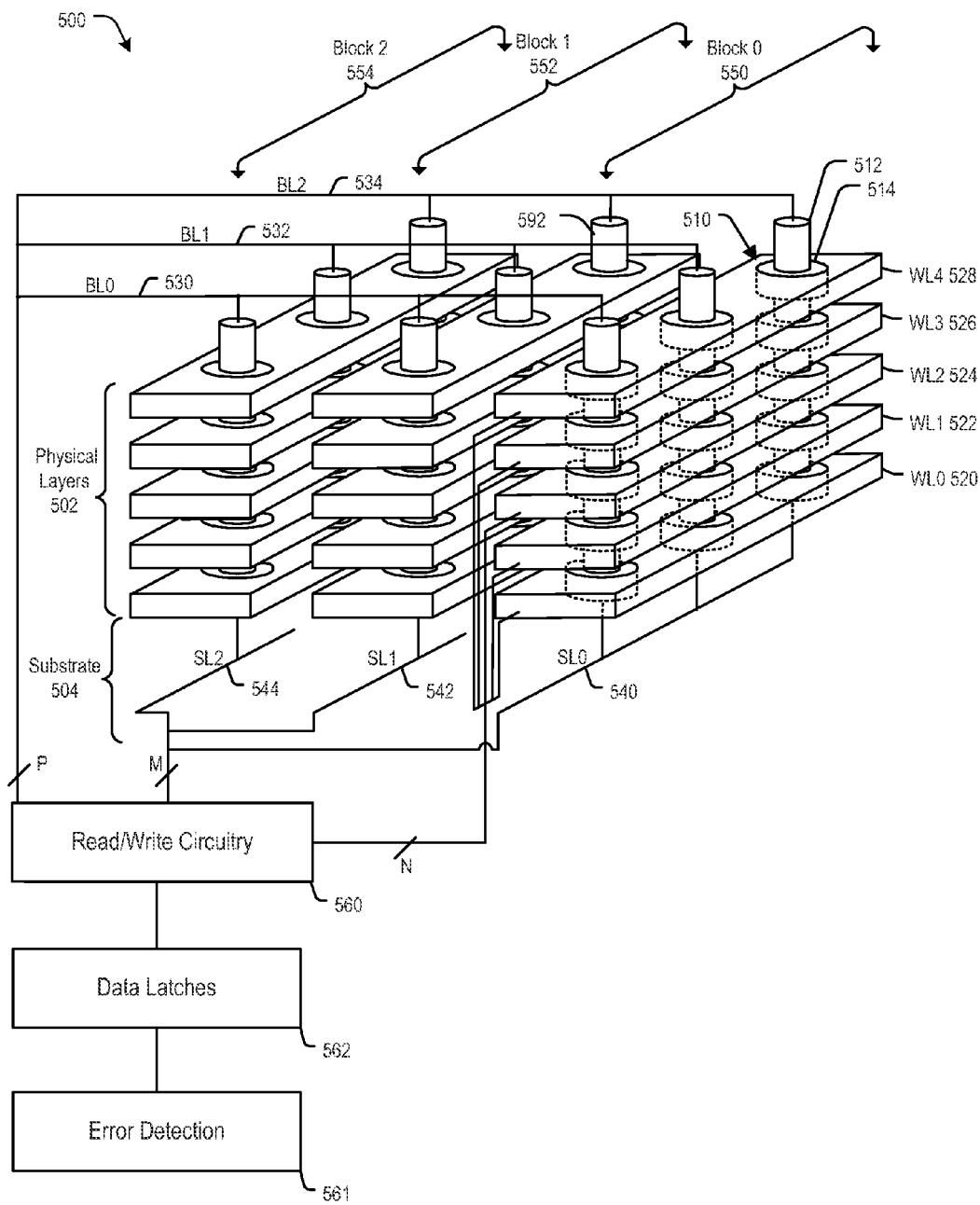
FIG. 5 is a diagram of a particular embodiment of a non-volatile memory including error detection circuitry.

FIG. 5 illustrates an embodiment of a 3D memory 500 in a NAND flash configuration. The 3D memory 500 may correspond to the 3D memory 104 of FIG. 1. The 3D memory 500 may include one or more groups of physical layers, such as an illustrative group of physical layers 502, that are monolithically formed above a substrate 504, such as a silicon substrate. The physical layers 502 may include at least a subset of the group of storage elements 106. Storage elements (e.g., memory cells), such as a representative memory cell 510, are arranged in arrays in the physical layers.

The representative memory cell 510 includes a charge trap structure 514 between a word line/control gate (WL4) 528 and a conductive channel 512. Charge may be injected into or drained from the charge trap structure 514 via biasing of the conductive channel 512 relative to the word line 528. For example, the charge trap structure 514 may include silicon nitride and may be separated from the word line 528 and the conductive channel 512 by a gate dielectric, such as a silicon oxide. An amount of charge in the charge trap structure 514 affects an amount of current through the conductive channel 512 during a read operation of the memory cell 510 and indicates one or more bit values that are stored in the memory cell 510.

The 3D memory 500 includes multiple erase blocks, including a first block (block 0) 550, a second block (block 1) 552, and a third block (block 2) 554. Each block 550-554 includes a "vertical slice" of the physical layers 502 that includes a stack of word lines, illustrated as a first word line (WL0) 520, a second word line (WL1) 522, a third word line (WL2) 524, a fourth word line (WL3) 526, and the fifth word line (WL4) 528. Multiple conductive channels (having a substantially vertical orientation with respect to FIG. 5) extend through the stack of word lines. Each conductive channel is coupled to a storage element in each word line 520-528, forming a NAND string of storage elements. FIG. 5 illustrates three blocks 550-554, five word lines 520-528 in each block, and three conductive channels in each block for clarity of illustration. However, the 3D memory 500 may have more than three blocks, more than five word lines per block, and more than three conductive channels per block.

Read/write circuitry 560 is coupled to the conductive channels via multiple conductive lines, illustrated as a first bit line (BL0) 530, a second bit line (BL1) 532, and a third bit line (BL2) 534 at a "top" end of the conducive channels (e.g., farther from the substrate 504) and a first source line (SL0) 540, a second source line (SL1) 542, and a third source line (SL2) 544 at a "bottom" end of the conductive channels (e.g., nearer to or within the substrate 504). The read/write circuitry 560 is illustrated as coupled to the bit lines 530-534 via "P" control lines, coupled to the source lines 540-544 via "M" control lines, and coupled to the word lines 520-528 via "N" control lines. Each of P, M, and N may have a positive integer value based on the specific configuration of the 3D memory 500. In the illustrative example of FIGS. 5, P=3, M=3, and N=5.

In a particular embodiment, each of the bit lines and each of the source lines may be coupled to the same end (e.g., the top end or the bottom end) of different conductive channels. For example, a particular bit line may be coupled to the top of a conductive channel 592 and a particular source line may be coupled to the top of the conductive channel 512. The bottom of the conductive channel 592 may be coupled (e.g., electrically coupled) to the bottom of the conductive channel 512. Accordingly, the conductive channel 592 and the conductive channel 512 may be coupled in series and may be coupled to the particular bit line and the particular source line.

The read/write circuitry 560 may operate as described with respect to the read/write circuitry 180 of FIG. 1. For example, data may be stored to storage elements coupled to the word line 528 and the read/write circuitry 560 may read bit values from the storage elements. As another example, the read/write circuitry 560 may apply selection signals to control lines coupled to the word lines 520-528, the bit lines 530-534, and the source lines 540-542 to cause a programming voltage (e.g., a voltage pulse or series of voltage pulses) to be applied across selected storage element(s) of the selected word line (e.g., the fourth word line 528). The read/write circuitry 560 may be coupled to error detection circuitry 561 (e.g., corresponding to the error detection circuitry 112 of FIG. 1) via data latches 562 (e.g., corresponding to the data latches 182 of FIG. 1).

During a read operation, the controller 120 may receive a request from a host device, such as the host device 130 of FIG. 1. The controller 120 may cause the read/write circuitry 560 to read bits from particular storage elements of the 3D memory 500 by applying appropriate signals to the control lines to cause storage elements of a selected word line to be sensed. Accordingly, the 3D memory 500 may be configured to read from and write data to one or more storage elements.

Figure 6:
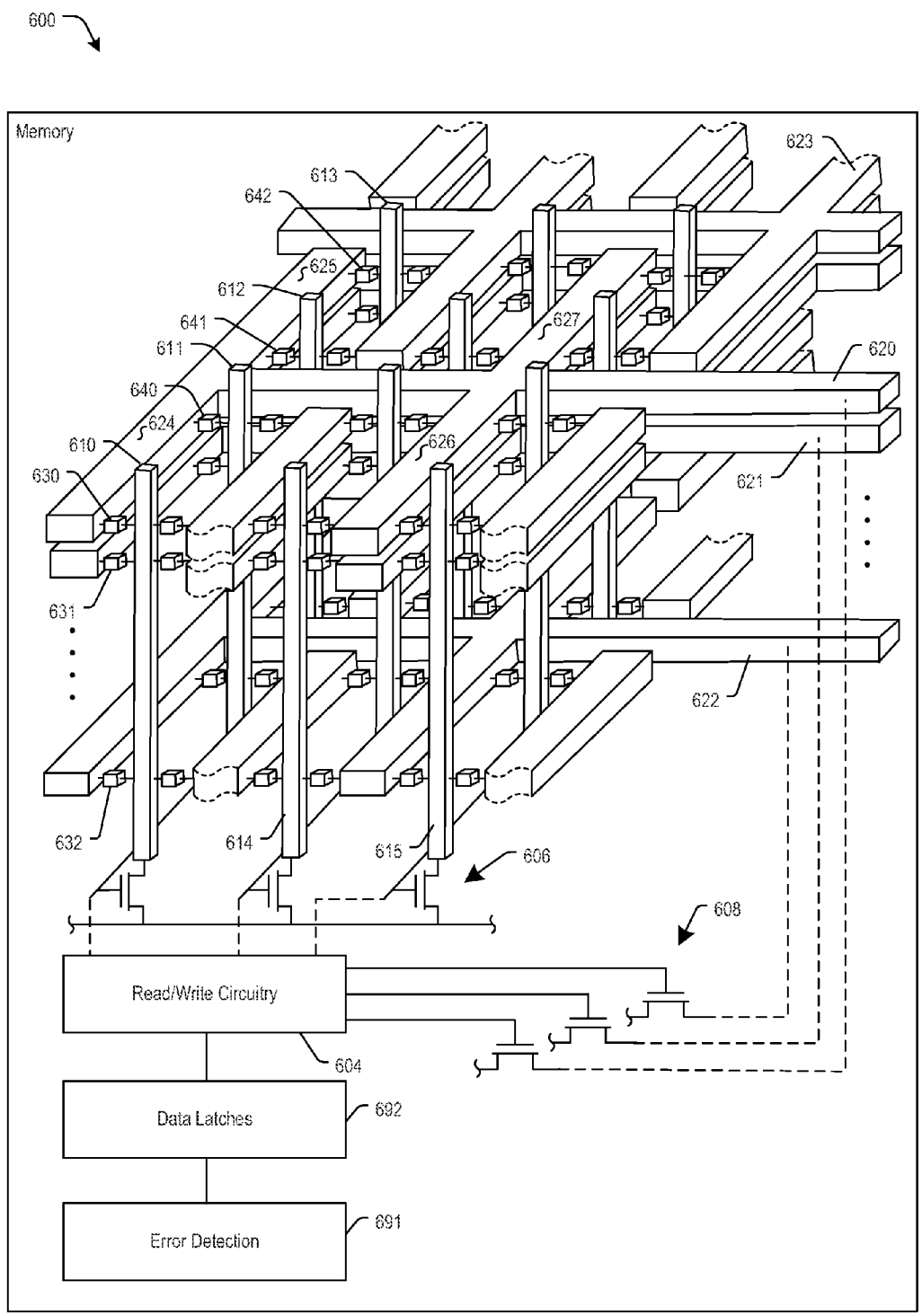
FIG. 6 is a diagram of another particular embodiment of a non-volatile memory including error detection circuitry.

FIG. 6 is a diagram of a particular embodiment of a memory 600. The memory 600 may be included in the data storage device 102 of FIG. 1. FIG. 6 illustrates a portion of a three-dimensional architecture of the memory 600, such as the 3D memory 104. In the embodiment illustrated in FIG. 6, the memory is a vertical bit line Resistive Random Access Memory (ReRAM) with a plurality of conductive lines in physical layers over a substrate (e.g., substantially parallel to a surface of the substrate), such as representative word lines 620, 621, 622, and 623 (only a portion of which is shown in FIG. 6) and a plurality of vertical conductive lines through the physical layers, such as representative bit lines 610, 611, 612, and 613. The word line 622 may include or correspond to a first group of physical layers and the word lines 620, 621 may include or correspond to a second group of physical layers. The memory 600 also includes a plurality of resistance-based storage elements (e.g., memory cells), such as representative storage elements 630, 631, 632, 640, 641, and 642, each of which is coupled to a bit line and a word line in arrays of memory cells in multiple physical layers over the substrate (e.g., a silicon substrate). The memory 600 also includes read/write circuitry 604, such as the read/write circuitry 180 of FIG. 1. The read/write circuitry 604 is coupled to word line drivers 608 and bit line drivers 606. The read/write circuitry 604 may also be coupled to error detection circuitry 691 (e.g., the error detection circuitry 112 of FIG. 1) via data latches 692 (e.g., the data latches 182 of FIG. 1).

In the embodiment illustrated in FIG. 6, each of the word lines includes a plurality of fingers (e.g., a first word line 620 includes fingers 624, 625, 626, and 627). Each finger may be coupled to more than one bit line. To illustrate, a first finger 624 of the first word line 620 is coupled to a first bit line 610 via a first storage element 630 at a first end of the first finger 624 and is coupled to a second bit line 611 via a second storage element 640 at a second end of the first finger 624.

In the embodiment illustrated in FIG. 6, each bit line may be coupled to more than one word line. To illustrate, the first bit line 610 is coupled to the first word line 620 via the first storage element 630 and is coupled to a third word line 622 via a third storage element 632.

During a write operation, the controller 120 may receive data from a host device, such as the host device 130 of FIG. 1. The controller 120 may send the data (or a representation of the data) to the memory 600. For example, the controller 120 may encode the data prior to sending the encoded data to the memory 600.

The read/write circuitry 604 may write the data to storage elements corresponding to the destination of the data. For example, the read/write circuitry 604 may apply selection signals to selection control lines coupled to the word line drivers 608 and the bit line drivers 606 to cause a write voltage to be applied across a selected storage element. For example, to select the first storage element 630, the read/write circuitry 604 may activate the word line drivers 608 and the bit line drivers 606 to drive a programming current (also referred to as a write current) through the first storage element 630. To illustrate, a first write current may be used to write a first logical value (e.g., a value corresponding to a high-resistance state) to the first storage element 630, and a second write current may be used to write a second logical value (e.g., a value corresponding to a low-resistance state) to the first storage element 630. The programming current may be applied by generating a programming voltage across the first storage element 630 by applying a first voltage to the first bit line 610 and to word lines other than the first word line 620 and applying a second voltage to the first word line 620. In a particular embodiment, the first voltage is applied to other bit lines (e.g., the bit lines 614, 615) to reduce leakage current in the memory 600.

During a read operation, the controller 120 may receive a request from a host device, such as the host device 130 of FIG. 1. The controller 120 may cause the read/write circuitry 604 to read bits from particular storage elements of the memory 600 by applying selection signals to selection control lines coupled to the word line drivers 608 and the bit line drivers 606 to cause a read voltage to be applied across a selected storage element. For example, to select the first storage element 630, the read/write circuitry 604 may activate the word line drivers 608 and the bit line drivers 606 to apply a first voltage (e.g., 0.7 volts (V)) to the first bit line 610 and to word lines other than the first word line 620. A lower voltage (e.g., 0 V) may be applied to the first word line 620. Thus, a read voltage is applied across the first storage element 630, and a read current corresponding to the read voltage may be detected at a sense amplifier of the read/write circuitry 604. The read current corresponds (via Ohm's law) to a resistance state of the first storage element 630, which corresponds to a logical value stored at the first storage element 630. The logical value read from the first storage element 630 and other elements read during the read operation may be provided to the controller 120.

Although various components depicted in FIGS. 1 and 3-6 herein are illustrated as block components and described in general terms, such components may include one or more dedicated hardware blocks, state machines, or other circuits configured to enable a data storage device, or components thereof, to perform one or more operations described herein. For example, components of the 3D memory 104, the controller 120, or both, may represent physical components, such as hardware controllers, state machines, logic circuits, or other structures, to enable reading data from and writing data to the 3D memory 104.

Alternatively, or in addition, one or more components of the data storage device 102 may be implemented using a microprocessor or microcontroller programmed to perform one or more operations described herein. To illustrate, operations corresponding to the controller 120, the read/write circuitry 180 may be implemented using a processor that executes instructions, as illustrative examples. In a particular embodiment, the instructions are stored at the 3D memory 104. Alternatively, or in addition, executable instructions that are executed by the processor may be stored at a separate memory location that is not part of the 3D memory 104, such as at a read-only memory (ROM).

Semiconductor memory devices, such as the 3D memory 104, include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., in a NOR memory array. NAND and NOR memory configurations described have been presented as examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor material, such as silicon.

The memory elements may be arranged in the single memory device level in an ordered array, such as in a plurality of rows and/or columns. However, the memory elements may be arranged in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration (e.g., in an x-z plane), resulting in a three dimensional arrangement of memory elements with elements arranged on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material, such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Two dimensional arrays may be formed separately and then packaged together to form a non-monolithic memory device having multiple layers of memory. For example, non-monolithic stacked memories can be constructed by forming memory levels on separate substrates and then stacking the memory levels atop each other. To illustrate, each of the memory device levels may have a corresponding substrate thinned or removed before stacking the memory device levels to form memory arrays. Because each of the memory device levels is initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

In some implementations, the 3D memory 104 is a non-volatile memory having a three-dimensional (3D) memory configuration that is monolithically formed in one or more physical levels of arrays of memory cells having an active area disposed above a silicon substrate. The active area of a memory cell may be an area of the memory cell that is conductively throttled by a charge trap portion of the memory cell. The data storage device 102 and/or the host device 130 may include circuitry, such as read/write circuitry, as an illustrative, non-limiting example, associated with operation of the memory cells.

Associated circuitry is typically used for operation of the memory elements and for communication with the memory elements. As non-limiting examples, memory devices may have circuitry for controlling and driving memory elements to perform functions such as programming and reading. The associated circuitry may be on the same substrate as the memory elements and/or on a separate substrate. For example, a controller for memory read-write operations may be located on a separate controller chip and/or on the same substrate as the memory elements One of skill in the art will recognize that this disclosure is not limited to the two dimensional and three dimensional structures described but cover all relevant memory structures within the spirit and scope of the disclosure as described herein and as understood by one of skill in the art.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
 a controller including error correction circuitry; and
 a non-volatile memory coupled to the controller, the non-volatile memory comprising a three-dimensional (3D) memory configuration monolithically formed in one or more physical levels of arrays of memory cells, the configuration having an active area disposed above a silicon substrate, circuitry associated with operation of the memory cells, a plurality of storage elements, and error detection circuitry,
 wherein the error detection circuitry is configured to generate an indicator of a number of errors associated with a portion of the non-volatile memory and the controller is configured to use the indicator.

2. The data storage device of claim 1, wherein the plurality of storage elements and the error detection circuitry are on a first die of the data storage device.

3. The data storage device of claim 2, wherein the controller is on a second die of the data storage device that is distinct from the first die, and further comprising a bus, wherein the controller is coupled via the bus to the non-volatile memory.

4. The data storage device of claim 1, wherein the error detection circuitry is configured to determine the number of errors in response to a read command, during a garbage collection operation, during a wear leveling operation, in response to expiration of a timer, or any combination thereof.

5. A data storage device comprising:
 a controller including error correction circuitry; and
 a non-volatile memory coupled to the controller, the non-volatile memory including memory cells and circuitry associated with operation of the memory cells,
 wherein the non-volatile memory includes a plurality of storage elements and error detection circuitry, and
 wherein the error detection circuitry of the non-volatile memory is configured to generate an indicator of a number of errors associated with a portion of the non-volatile memory and the controller is configured to use the indicator.

6. A method comprising:
 at a non-volatile memory of a data storage device, the non-volatile memory comprising a three-dimensional (3D) memory configuration monolithically formed in one or more physical levels of arrays of memory cells, the configuration having an active area disposed above a silicon substrate and circuitry associated with operation of the memory cells, performing:

generating, at error detection circuitry included in the non-volatile memory, an indication of a number of errors associated with a portion of the non-volatile memory; and providing the indication from the non-volatile memory to a controller of the data storage device, wherein the controller includes error correction circuitry.

7. The method of claim 6, further comprising:

reading data from the portion of the non-volatile memory; and providing the data associated with the portion of the non-volatile memory to the error detection circuitry.

8. The method of claim 7, further comprising providing the data to the controller, wherein the data is provided to the controller in response to receiving a data request for the data from the controller.

9. The method of claim 6, wherein the indication includes a value that is equal to a number of failed parity checks.

10. The method of claim 6, wherein the indication of the number of errors is generated in response to expiration of a timer.

11. The method of claim 6, further comprising providing location information associated with the portion of the non-volatile memory to the controller.

12. The method of claim 6, wherein the portion of the non-volatile memory comprises a first word line of the non-volatile memory, and further comprising, in response to a determination that the indication satisfies a threshold:

generating a second indication of a second number of errors associated with a second word line of the non-volatile memory, wherein the second word line is adjacent to the first word line;

providing the second indication from the non-volatile memory to the controller; and detecting, based on the indication and the second indication, a short condition between the first word line and the second word line.

13. The data storage device of claim 1, wherein in response to the number of errors exceeding a threshold, the controller is configured to request data from the portion of the non-volatile memory and to perform error correction on the data.

14. The data storage device of claim 1, wherein the controller is configured to use the indicator to track errors at the non-volatile memory and to initiate a memory management operation based on the tracked errors.

15. The data storage device of claim 14, wherein the memory management operation includes comparing error data to identify a word line to word line short condition.

16. The data storage device of claim 1, wherein the number of errors is associated with an error correction code (ECC) codeword read by the non-volatile memory from the portion of the non-volatile memory, and wherein the indicator includes fewer bits than the ECC codeword.

17. The data storage device of claim 5, wherein the controller is configured to perform remediation based on the indicator, and wherein the remediation includes reading data from the portion and performing an error correction of the data.

18. The data storage device of claim 5, wherein the error detection circuitry and the error correction circuitry comprise a distributed ECC engine.

19. The data storage device of claim 18, wherein the error detection circuitry includes a syndrome generator, and wherein the indicator includes syndrome data.

20. The data storage device of claim 18, wherein the error detection circuitry includes a syndrome generator and a polynomial generator, and wherein the indicator represents an error location polynomial from the polynomial generator or corresponds to an order of the error location polynomial.

* * * * *